(12) United States Patent
Hopkins

(10) Patent No.: US 6,187,354 B1
(45) Date of Patent: Feb. 13, 2001

(54) MICROWAVE STEAMING TRAY

(75) Inventor: Gary L. Hopkins, Scottsburg, IN (US)

(73) Assignee: Steamway Franchise Sales, Inc., Scottsburg, IN (US)

(*) Notice: Under 35 U.S.C. 154(b), the term of this patent shall be extended for 0 days.

(21) Appl. No.: 09/352,901

(22) Filed: Jul. 13, 1999

Related U.S. Application Data

(60) Provisional application No. 06/094,802, filed on Jul. 31, 1998.

(51) Int. Cl.[7] ................................ A23L 1/01; B65B 55/00
(52) U.S. Cl. ........................ 426/234; 426/243; 426/107; 426/113; 219/734; 219/735
(58) Field of Search ................................ 426/107, 234, 426/113, 243, 403, 120; 219/735, 733

(56) References Cited

U.S. PATENT DOCUMENTS

| D. 378,178 | 2/1997 | Sawyer ................................ D7/359 |
|---|---|---|
| D. 420,584 | * 2/2000 | Hopkins ................................ D9/423 |
| 4,140,889 | 2/1979 | Mason, Jr. et al. ............. 219/10.55 E |
| 4,286,136 | 8/1981 | Mason, Jr. ..................... 219/10.55 E |
| 4,317,017 | 2/1982 | Bowen .......................... 219/10.55 E |
| 4,416,906 | * 11/1983 | Watkins .............................. 426/107 |
| 4,425,368 | * 1/1984 | Watkins .............................. 426/107 |
| 4,481,392 | 11/1984 | Bibbe et al. ................... 219/10.55 E |
| 4,529,089 | 7/1985 | Gasbarra et al. ..................... 206/525 |
| 4,560,850 | 12/1985 | Levendusky et al. ........ 219/10.55 E |
| 4,873,406 | 10/1989 | Connor .......................... 219/10.55 E |
| 4,916,280 | * 4/1990 | Havette ........................... 219/10.55 E |
| 4,923,704 | 5/1990 | Levinson ................................ 426/243 |
| 5,005,703 | 4/1991 | Bodker .................................... 206/563 |
| 5,310,981 | * 5/1994 | Sarnoff et al. ......................... 219/731 |
| 5,352,465 | * 10/1994 | Gondek et al. ......................... 426/87 |
| 5,370,042 | 12/1994 | Tolchin et al. .......................... 99/417 |
| 5,521,361 | 5/1996 | Strait, Jr. ................................ 219/731 |
| 5,750,967 | 5/1998 | Sprauer, Jr. ............................... 21/735 |
| 5,797,312 | 8/1998 | Brant ....................................... 99/415 |

* cited by examiner

Primary Examiner—Nina Bhat
(74) Attorney, Agent, or Firm—Ice Miller; Russell E. Fowler, II; Jay G. Taylor

(57) ABSTRACT

A microwave steam tray is made of a thermo-formed co-polymer polypropylene quality food grade plastic. The microwave steam tray comprises a plastic container having a dish portion and a connected lid. The dish portion includes a bottom surface with four sidewalls extending therefrom to define a dish interior. A plurality of ribs are raised from the bottom surface to provide a cooking plane. Steam channels are formed between the ribs. The ribs extend radially from a moisture reservoir positioned within the dish interior. The moisture reservoir includes a retaining wall having a cup portion formed within the retaining wall. Recesses are formed within the retaining wall. Liquid based food products may be placed in the moisture cylinder during cooking. Steam generated from the moisture reservoir easily travels down the radial steam channels. Some of the liquid based food product from the reservoir may be allowed to spill from the recesses in the retaining wall to provide a "volcano effect" in the microwave steam tray.

24 Claims, 9 Drawing Sheets

MICROWAVE STEAMING TRAY

CROSS REFERENCE TO RELATED APPLICATIONS

This application claims the benefit of U.S. provisional patent application Ser. No. 60/094,802, filed Jul. 31, 1998.

BACKGROUND OF THE INVENTION

The present invention relates to the field of cooking devices. More particularly, the present invention relates to a steam tray for use in a microwave oven for cooking meats, vegetables, and other food products.

Cooking food in a microwave oven can be a difficult task. Foods cooked in a microwave oven tend to be tough and/or dry in texture and consistency rather than tender and moist. When liquid is added to the food in an attempt to retain moisture, the food can become soggy and undesirable. In addition, microwave ovens do not evenly distribute heat to the product being cooked. This results in a cooked food product that may be very hot in one area, but cold in another area. Because of this, many people consider microwave cooking to be boring and bland. Nevertheless, consumers often prefer to cook foods in a microwave oven because of the reduced cooking time required to heat foods in a microwave oven.

Accordingly, it is an object of the present invention to provide a cooking device that cooks meats and other food products in the microwave to a texture and consistency that is tender and moist while preventing the food products from becoming soggy and undesirable. Another object of the present invention is to provide a re-usable microwave cooking device that more evenly and efficiently distributes heat to the food being cooked. Still another object of the present invention is to provide a microwave cooking device that cooks fresh foods in a healthy manner, specifically steaming, while also allowing the consumer to prepare a delicious food dish in a short amount of time. Another object of the invention is to provide a novel cooking device to increase the overall enjoyment of cooking in a microwave oven.

SUMMARY OF THE INVENTION

A microwave cooking device is disclosed having a dish portion and a lid for covering the dish portion. The dish portion includes a bottom surface and at least one sidewall extending therefrom for containing the food to be cooked. A moisture reservoir is positioned within the dish portion for containing a liquid based product, the moisture reservoir including an outer retaining wall which encloses an inner cup portion, the retaining wall having a top and a base and at least one recess formed in the top of the retaining wall which extends toward the base of the retaining wall. Ribs which rise above the bottom surface of the dish portion are positioned radially from the moisture reservoir.

When a liquid based product is placed in the moisture reservoir and the cooking device is heated in a microwave oven, the radiant energy of the microwave oven heats the liquid product and causes steam to rise from the liquid based product. This steam assists in cooking any food placed in the cooking device and adds flavor while increasing the desirability of the food texture. If the liquid based product is in a cooled condition before it is heated, such as frozen or gelled condition, the liquid based product will melt and fill the moisture reservoir. As the moisture reservoir is filled, the liquid based product will flow out of the at least one recess in the retaining wall and on to the bottom surface of the dish portion, thus creating a visually pleasing "volcano effect" when the food is being cooked. Furthermore, the liquid product that spills from the moisture reservoir further flavors the food that is cooking in the device as it flows from the moisture reservoir.

The moisture reservoir may also be used to hold a cup containing any one of a number of flavored sauces. The cup includes a flange that rests on the top of the retaining wall and at least one tab that fits into the recess in the retaining wall. The cup may be placed in the moisture cylinder before or after cooking, depending upon whether the user desires to use the sauce for flavoring during cooking and whether the user desires a hot or cold sauce.

DETAILED DESCRIPTION OF THE INVENTION

Figure 1:
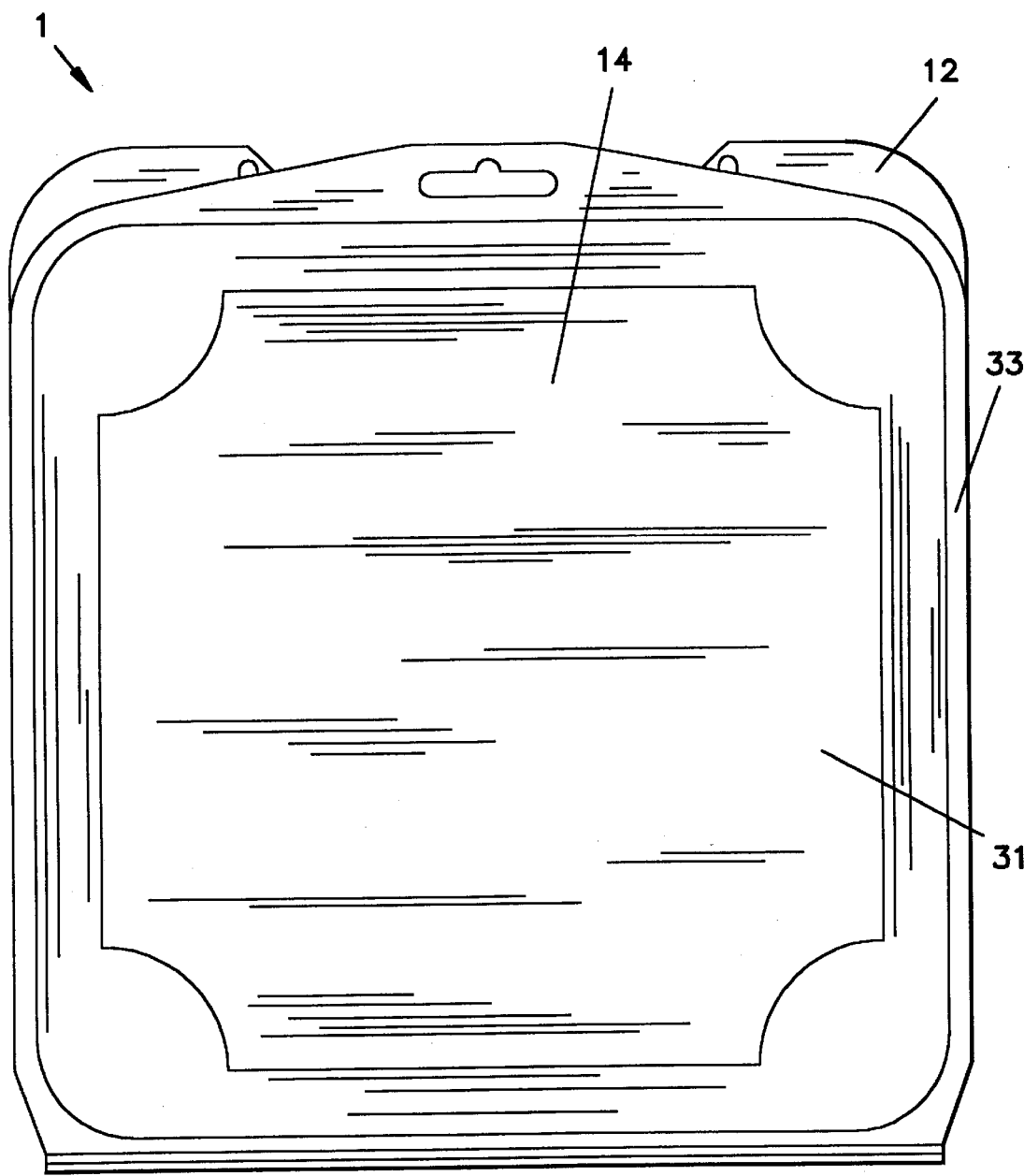
FIG. 1 is a top plan view of a microwave steaming tray showing a lid in a closed position.
Figure 2:
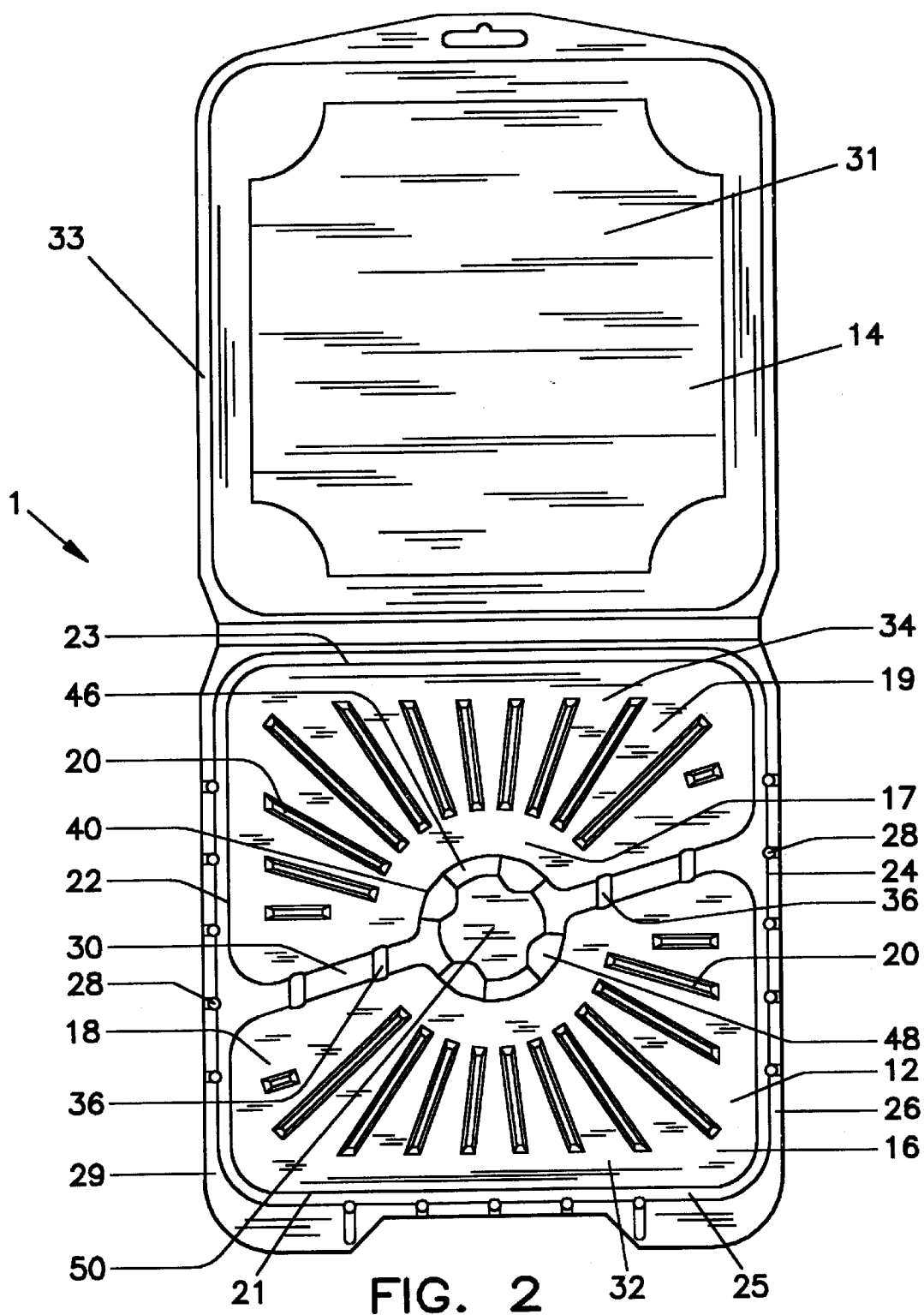
FIG. 2 is a top plan view of the steaming tray of FIG. 1 showing the lid in an open position.
Figure 3:
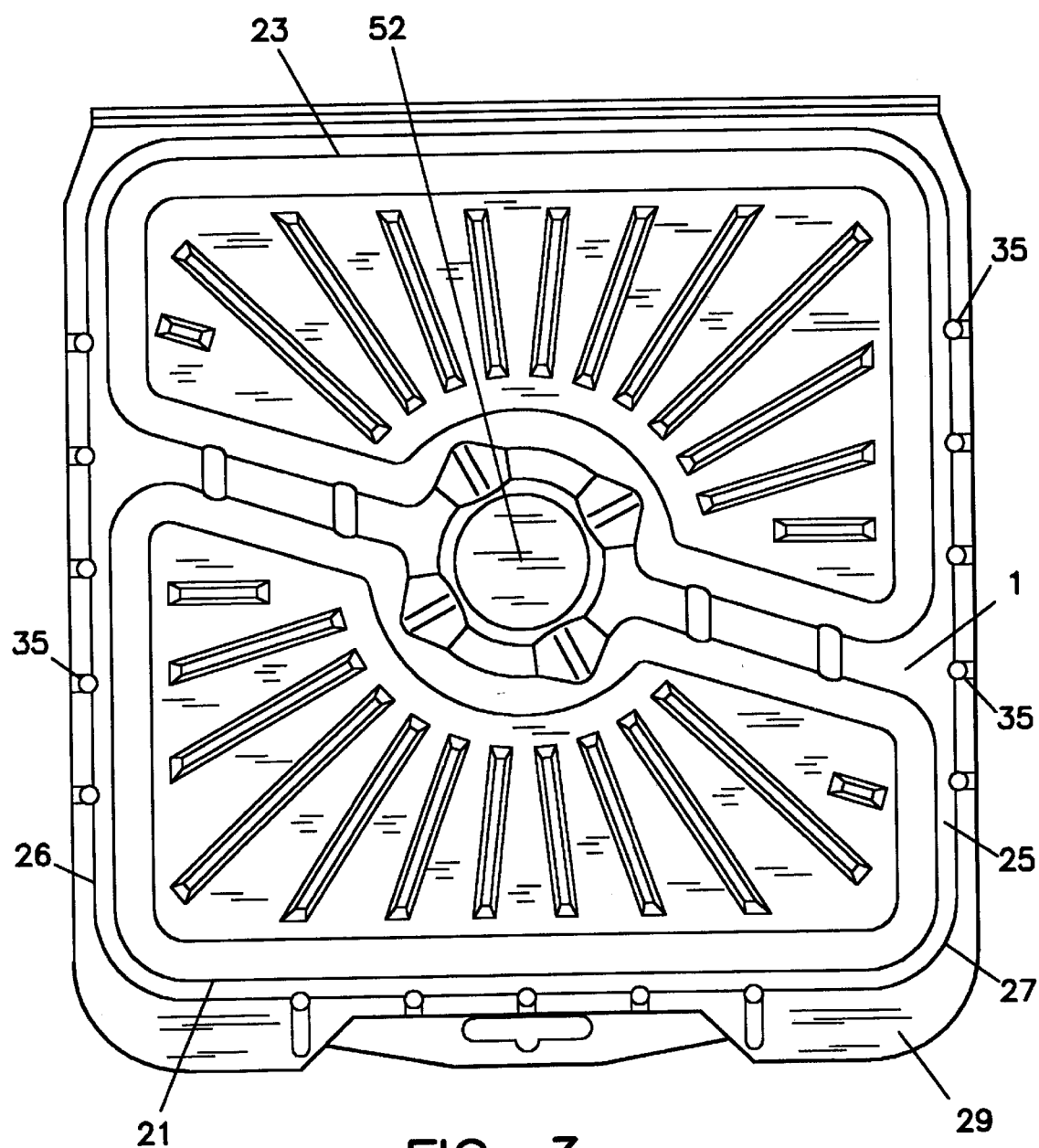
FIG. 3 is a bottom plan view of the steaming tray of FIG. 1 with the lid in the closed position.
Figure 4:
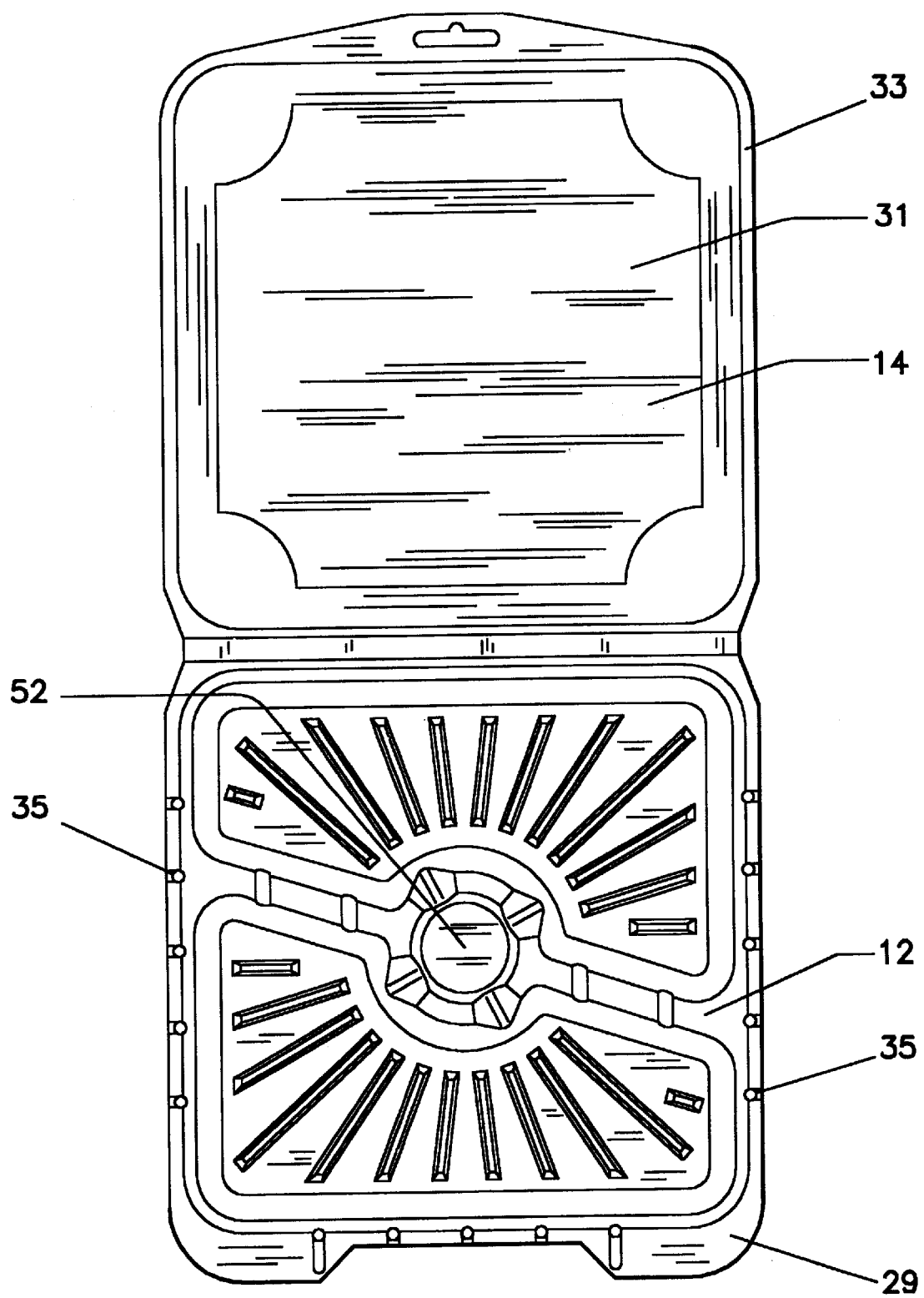
FIG. 4 is a bottom plan view of the steaming tray of FIG. 1 with the lid in the open position.
Figure 5:
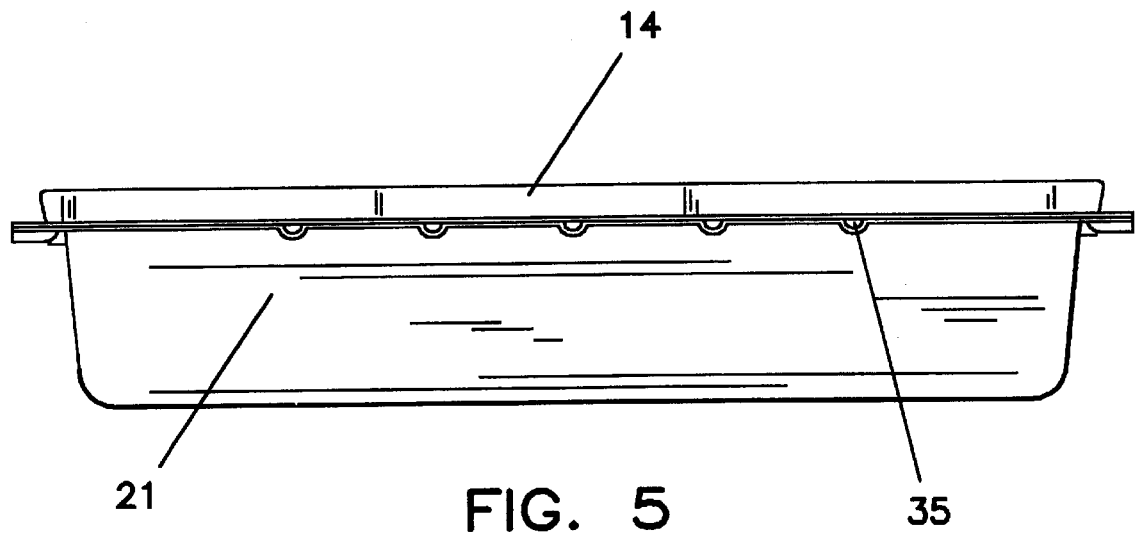
FIG. 5 is a front elevational view of the steaming tray of FIG. 1 with the lid in the closed position.
Figure 6:
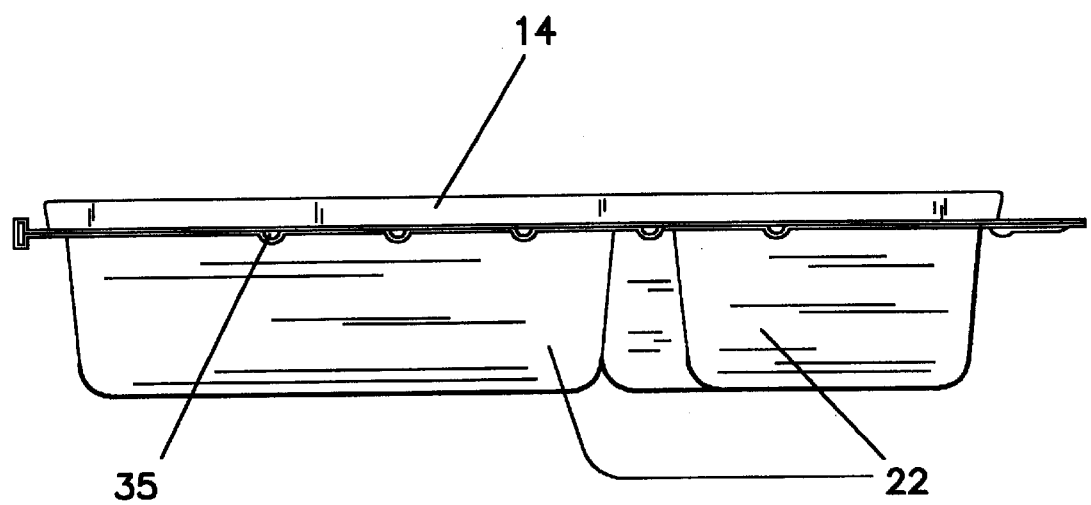
FIG. 6 is a left side elevational view of the steaming tray of FIG. 1 with the lid in the closed position.
Figure 7:
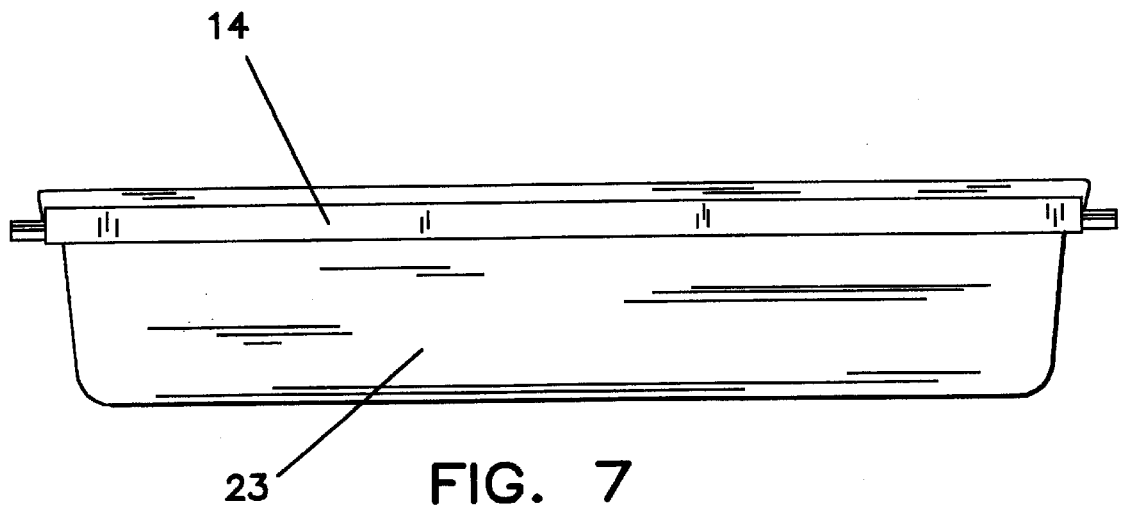
FIG. 7 is a rear elevational view of the steaming tray of FIG. 1 with the lid in the closed position.
Figure 8:
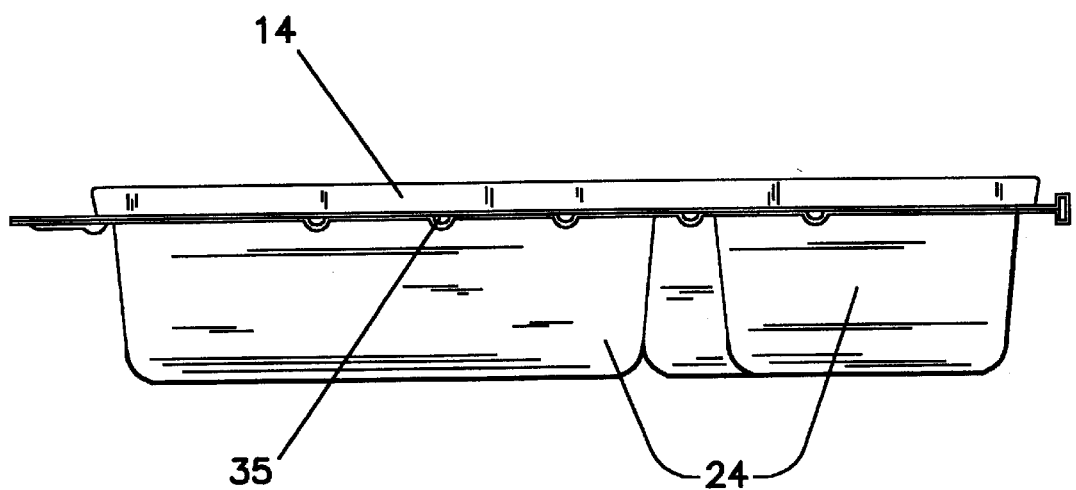
FIG. 8 is a right side elevational of the steaming tray of FIG. 1 with the lid in the closed position.
Figure 9:
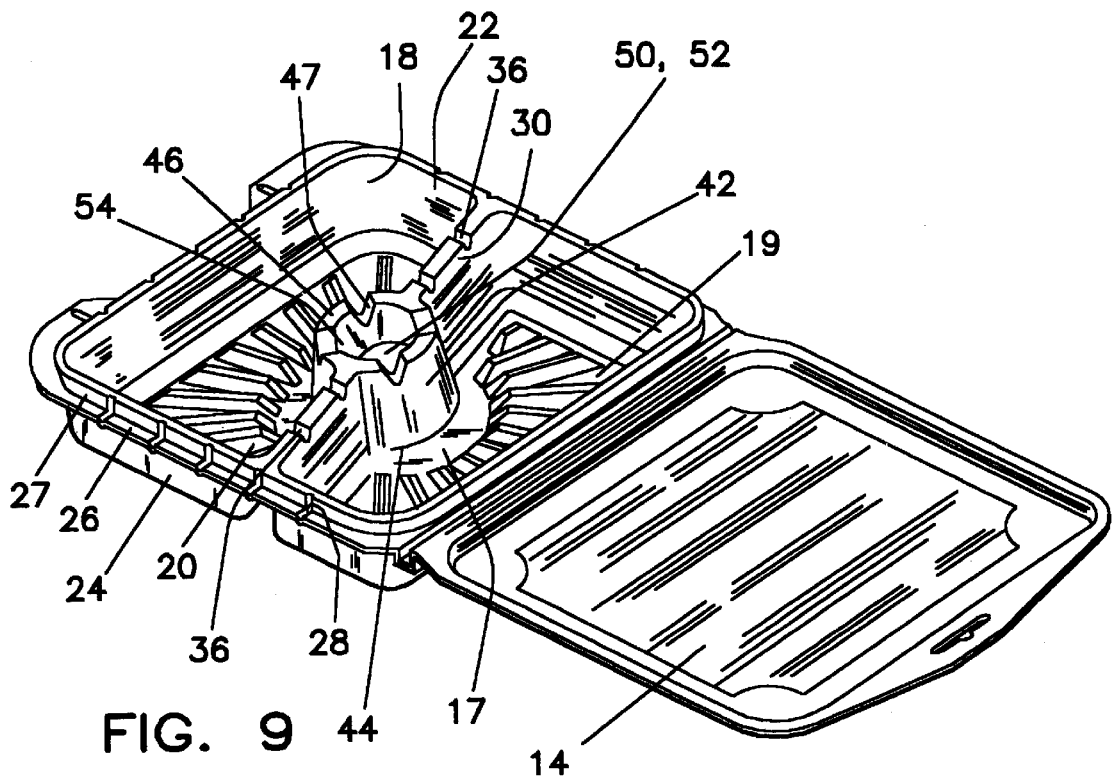
FIG. 9 is a top perspective view of the steaming tray of FIG. 1 with the lid in the open position.
Figure 10:
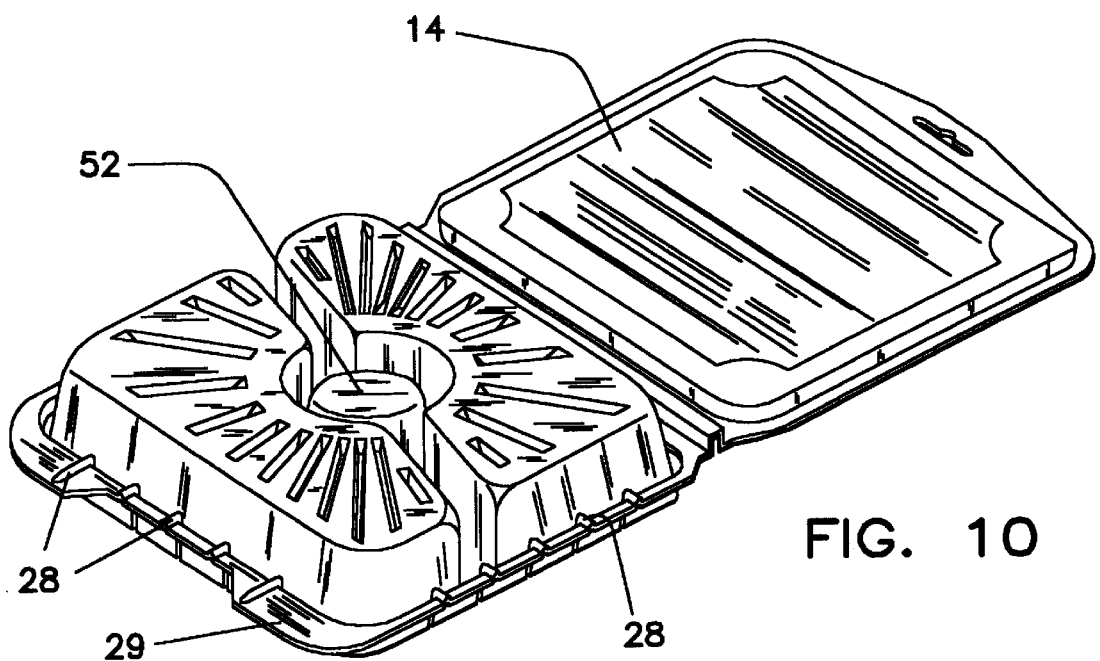
FIG. 10 is a bottom perspective view of the steaming tray of FIG. 1 with the lid in the open position.

A microwave steam tray 1 is made of a thermo-formed co-polymer polypropylene quality food grade plastic. As shown in FIGS. 1–10, the microwave steam tray 1 comprises a plastic container having a dish portion 12 and a lid 14. The dish portion 12 includes a bottom surface 16 with four sidewalls 21–24 extending therefrom to define a dish interior 18. A plurality of ribs 20 are raised from the bottom surface 16 to provide a cooking plane. The ribs 20 extend radially from a centrally located circle 17 on the bottom surface 16. The ribs terminate before reaching the four sidewalls. Steam channels 19 are formed between the ribs 20.

The four sidewalls 21–24 are bounded by a ridge 25 which extends outward from and encircles the top of the four sidewalls. A lid seat 26 is attached to the ridge 25 and provides a surface for engagement with the lid 14. The lid seat 26 includes a vertical skirt 27 depending from the ridge 25, and a flange 29 which extends horizontally outward from the skirt 27. L-shaped indentations 28 are formed in the lid seat 26. The L-shaped indentations extend down the skirt 27 and across the flange 29.

The lid 14 is attached to the flange 29, adjacent to one of the sidewalls 23. The lid includes a cover member 31 and a seal 33 which surrounds the cover member. When the lid 14 is closed over the dish portion 12, the lid seal 33 engages the lid seat 26. Engagement of the lid seal 33 with the lid seat 26 forms air passages or vents 35 between the lid and the L-shaped indentations 28. The vents 35 allow communication of air into and out of the dish interior 18. With the lid closed, the tray measures approximately 7¾"×7¾"×1¾".

A dividing wall 30 is provided in the dish interior 18. The dividing wall 30 extends between two opposing sidewalls 22 and 24 to split the dish interior 18 into a first trapezoidal chamber 32 and a second trapezoidal chamber 34. The dividing wall 30 includes four grooves 36 placed upon the top of the dividing wall 30. Each of the four grooves 36 extends from the first trapezoidal chamber 32 to the second trapezoidal chamber 34. A cylindrical moisture reservoir 40 or "flavor volcano" is formed in the center of the dividing wall 30.

The moisture reservoir 40 is positioned in the center of the dish interior 18 such that the ribs extend in a radial direction from the moisture reservoir 40. The moisture reservoir 40 includes a cylindrical retaining wall 42 forming a circular base 44 which contacts the bottom surface 16 at the centrally located circle 17. The retaining wall 42 extends upward as high as the four sidewalls, and terminates at its top in a rim 46. Four V-shaped recesses 48 are formed in the retaining wall 42 beginning at the cylinder rim 46. Each of the V-shaped recesses form openings 47 upon the top of the retaining wall 42. The openings 47 gradually taper in size moving downward upon the retaining wall 42 toward the circular base 44 until the openings 47 terminate near the approximate middle of the retaining wall.

A cup portion 50 is formed within the moisture reservoir 40 on the interior of the retaining wall. The cup portion 50 has a closed bottom 52 which is located below the V-shaped recesses. A cylindrical cup wall 54 extends from the cup bottom to the rim 46, and the rim defines an open cup top. The cup portion is capable of holding liquid between the bottom of the cup portion and the V-shaped recesses.

In operation, the microwave steam tray 1 may be used to cook chicken, fish, shrimp, scallops, vegetables or other food products in a microwave oven. The food to be cooked is placed in the dish interior on the ribs 20 of either the first trapezoidal chamber or the second trapezoidal chamber. Water, butter, sauce, or other liquid based product is placed within the cup portion 50 of the moisture reservoir 40, which keeps the liquid separate from the first and second trapezoidal chambers. After the lid 14 is closed over the dish portion 12, the food is ready for cooking in a microwave oven. As the microwave oven heats the contents of the steam tray 1, steam rises from the liquid placed in the cup portion 50 of the moisture reservoir 40. The steam released from the moisture reservoir 40 enters the two trapezoidal chambers 32–34 through the V-shaped recesses 48 and the top of cup 50 and cooks the food in the trapezoidal chambers. The steam released from the moisture reservoir also adds moisture and flavor to the contents of the food. The radial orientation of the ribs 20 around the moisture reservoir 40 allows steam emanating from the moisture reservoir to easily travel to and through the steam channels between the ribs and fill the entire steam tray. Because steam is easily channeled between the ribs, food placed in the tray is steam cooked from below the cooking plane as well as above the cooking plane.

As steam is released from the moisture reservoir during cooking, pressure builds within the steam tray. The grooves 36 on the dividing wall 30 and the V-shaped recesses 48 on the moisture reservoir 40 both assist with pressure equalization between the first 32 and second trapezoidal chambers 34. The vents 35 formed by the L-shaped indentations 28 and the lid 14 allow steam to escape from the dish interior, thus providing pressure relief and preventing the lid 14 from opening due to excess pressure build-up. The vents 35, which are approximately ⅛" in diameter, are sized to maintain a steam pressure within the steam tray which is desirable for cooking various food products.

In addition to providing moisture and flavor to the contents of the steam tray 1, the moisture reservoir 40 may also be used as a convenient sauce dish for dipping the cooked food products. The user may choose to use the same liquid based product for dipping as was used during cooking, or the user may add a new sauce for dipping after cooking.

Furthermore, the moisture reservoir 40 may further be used to provide a "volcano effect". For example, the "volcano effect" is demonstrated in the steam tray if refrigerated butter is placed in the moisture reservoir 40 and the tray is heated by the radiant energy of the microwave oven. As the butter melts in the moisture reservoir 40, the cup portion 50 will fill with butter and the excess butter will flow over the sides of the V-shaped recesses 48, onto the bottom surface 16 of the dish interior, down the steam channels, and into the food product being cooked. This "volcano effect" is also desirable for cooking several food dishes because it adds flavor to the dish as it cooks. In addition, the "volcano effect" serves as an interesting visual effect, adding further enjoyment to cooking with a microwave oven.

Figure 11:
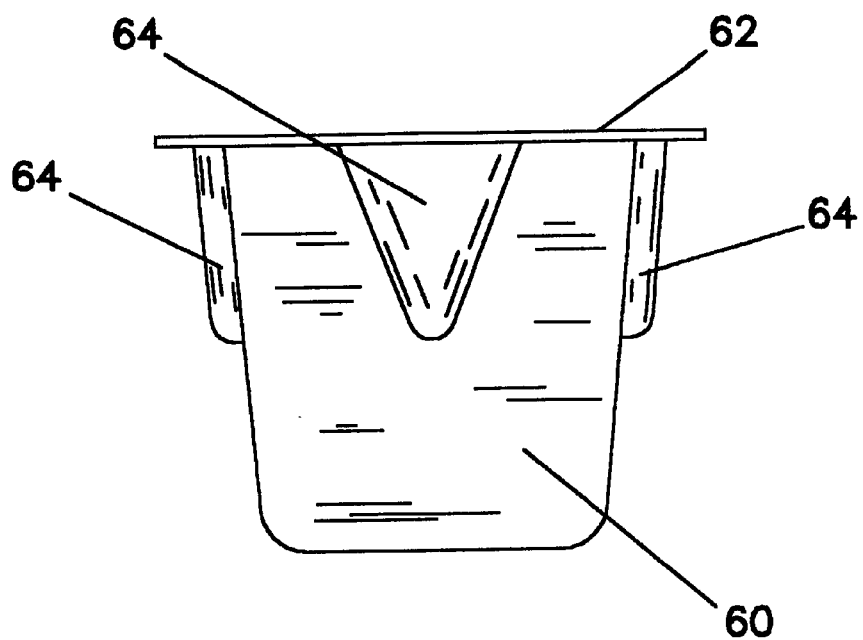
FIG. 11 is a side view of a cup for use with the steaming tray of FIG. 1.
Figure 12:
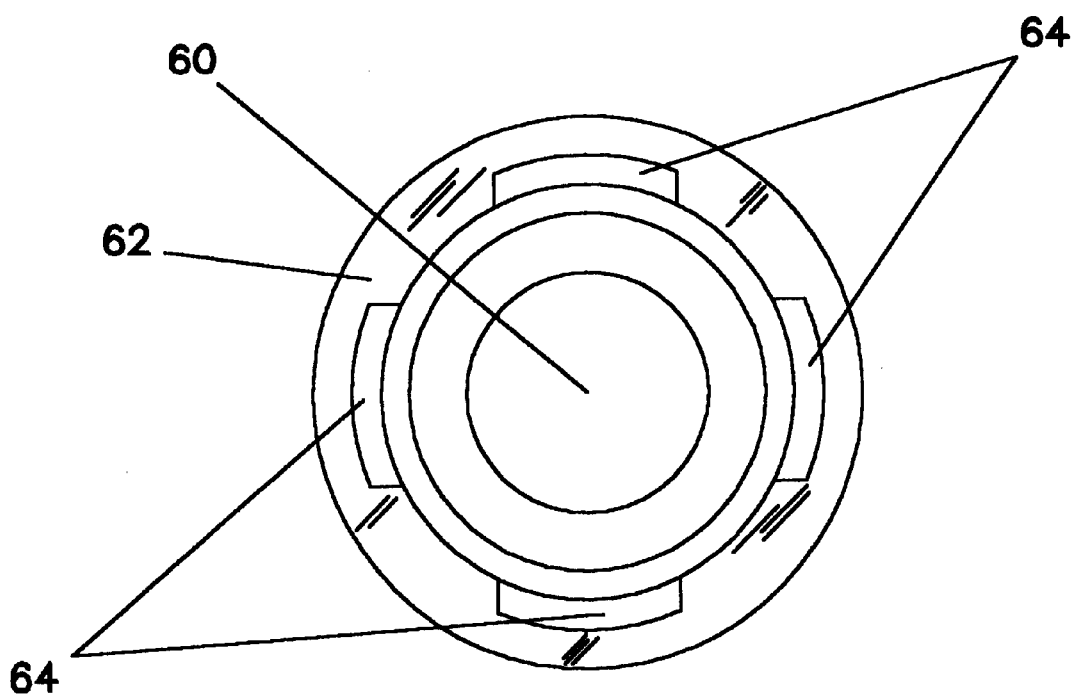
FIG. 12 is a top view of the cup of FIG. 11.

In an alternative embodiment of the invention, the cup portion 50 may be used to hold a separate cup 60. The cup 60 is comprised of a plastic material capable of use in the microwave. As shown in FIGS. 11 and 12, the cup 60 includes a flange 62 that is designed to rest on the rim 46 of the moisture reservoir 40. The cup 60 also includes four tabs 64, spaced at 90 degree intervals around the cup. The four tabs are V-shaped with a wide end near the flange 62 that gradually tapers to a narrow end. The four tabs are designed to fit within the V-shaped recesses 48 of the moisture reservoir and secure the cup within the moisture reservoir. It is envisioned that the user of the microwave steaming tray 1 may choose between a variety of cups 60 holding various food products for use in the microwave steaming tray 1. For example, one type of cup that may be purchased by the user may contain butter while another cup may contain a barbeque flavor sauce. The cups may be sold with a peelable seal placed across the top of the cup. The user may purchase the cup of his or her choice, remove the seal, and insert the cup into the moisture reservoir for flavoring the food being cooked in the microwave steaming tray 1. Alternatively, if a chilled dipping sauce is desired, the cup may be placed in the microwave steaming tray after the food is cooked, and the food cooked in the tray may be dipped in the chilled sauce. After using the cup 60, it may be discarded and a new cup may be used when the microwave steaming tray is used again to cook food. In this manner, a convenient, easy, and tasty method of microwave cooking is provided.

Figure 13:
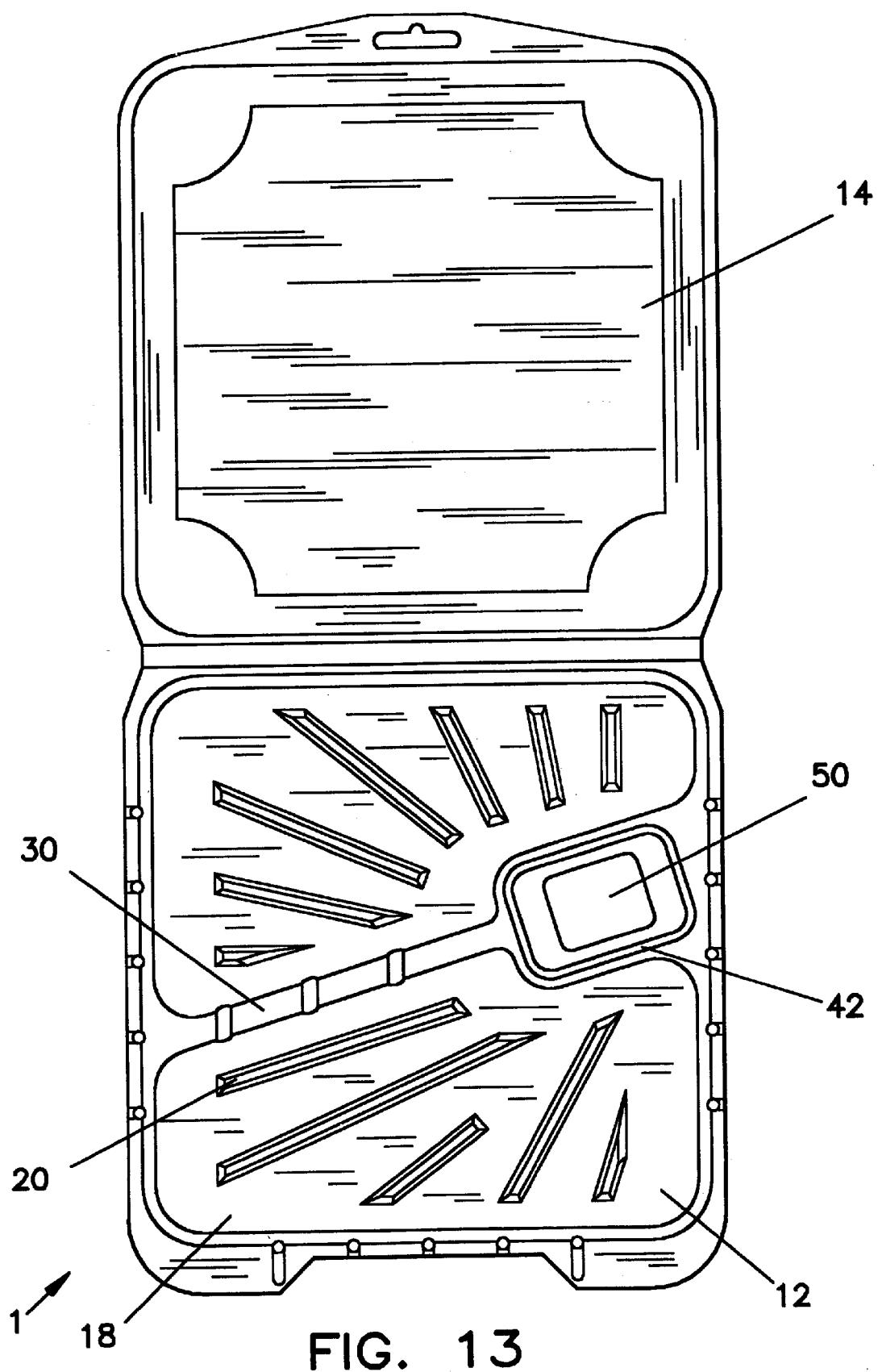
FIG. 13 is a top view of a microwave steaming tray having a cup portion located away from the center of the steaming tray.

Those of skill in the art will appreciate that many changes could be made to the embodiments described herein without departing from the spirit and scope of the inventions. By way of example, the moisture reservoir is not required to be cylindrical and does not need to be located in the exact center of the dish portion 12, as shown in FIG. 13. Similarly, the recesses 48 formed in the retaining wall 42 and the tabs of cup 60 are not required to be V-shaped, but may be any number of shapes, such as square or circular. Additional changes will be readily apparent to those of skill in the art and the invention, as described in the claims, should not be limited to the embodiments shown.

What is claimed is:

1. A cooking device capable of being used in a microwave oven comprising:
   a. a dish portion having a bottom surface and at least one sidewall extending therefrom for containing food to be cooked;
   b. a moisture reservoir positioned within the dish portion for containing a liquid based product, the moisture reservoir including a retaining wall which encloses a central cup portion, the retaining wall having a top and a base and at least one recess formed in the top of the retaining wall which extends toward the base of the retaining wall; and
   c. a lid for covering the dish portion and the moisture reservoir.

2. The cooking device of claim 1 further comprising ribs positioned upon and rising above the bottom surface of the dish portion, the ribs being oriented upon the bottom surface to extend in a radial direction from the moisture reservoir.

3. The cooking device of claim 1 wherein the recess formed in the retaining wall is V-shaped.

4. The cooking device of claim 1 further comprising a dividing wall extending through the dish portion to divide the dish portion into a first chamber and a second chamber.

5. The cooking device of claim 3 wherein the retaining wall of the moisture reservoir forms part of the dividing wall.

6. The cooking device of claim 1 further comprising a cup dimensioned to fit within the moisture reservoir.

7. The cooking device of claim 6 wherein the cup includes a peelable seal placed across the top of the cup.

8. The cooking device of claim 6 wherein the cup has at least one tab, the cup situated within the moisture reservoir such that the at least one tab fits into the recess in the retaining wall.

9. The cooking device of claim 6 wherein the cup includes a flange and the retaining wall of the moisture reservoir includes a rim, the cup situated within the moisture reservoir such that the flange rests upon the retaining wall rim.

10. The cooking device of claim 1 wherein the lid is connected to the at least one sidewall.

11. The cooking device of claim 1 wherein the at least one sidewall includes a ridge defining a top boundary, the ridge including indentations.

12. The cooking device of claim 11, further comprising a lid seat attached to the ridge, wherein the indentations extend from the ridge to the lid seat.

13. The cooking device of claim 12 wherein the lid seat includes a skirt depending from the ridge and a flange extending outward from the skirt, wherein the indentations extend from the ridge, down the skirt, and across the flange.

14. The cooking device of claim 12 wherein the lid includes a lid seal for covering the lid seat, the lid seal and indentations thereby forming vents for providing pressure relief when excess pressure builds in the cooking device.

15. A method of cooking food in a microwave oven comprising the steps of:
   a. providing a cooking device having a bottom surface, at least one sidewall and a moisture reservoir positioned within the at least one sidewall of the cooking device, the moisture reservoir including a retaining wall which encloses a central cup portion, the retaining wall having a top and a base and at least one recess formed in the top of the retaining wall which extends toward the base of the retaining wall;
   b. placing a solidified liquid based product in the moisture reservoir;
   c. placing food in the cooking device;
   d. placing the cooking device in a microwave oven to cause the radiant energy of the microwave oven to cook the food and heat the liquid based product, thus causing the liquid based product to melt such that a portion of the melted liquid based product flows over the at least one recess in the moisture reservoir and onto the bottom surface of the cooking device.

16. A method of cooking food in a microwave oven comprising the steps of:
   a. providing a cooking device having a bottom surface, at least one sidewall and a moisture reservoir positioned within the at least one sidewall of the cooking device, the moisture reservoir including a retaining wall which encloses a central cup portion, the retaining wall having a top and a base;
   b. placing food in the cooking device;
   c. placing the cooking device in a microwave oven to cause the radiant energy of the microwave oven to cook the food;
   d. providing a cup for holding liquid based products, the cup dimensioned to fit into the moisture reservoir;
   e. placing the cup in the moisture reservoir.

17. The method of claim 16 wherein the moisture reservoir of step a further includes at least one recess formed in the top of the retaining wall which extends toward the base of the retaining wall.

18. The method of claim 17 wherein the cup of step d further includes at least one tab dimensioned to fit into the recess in the moisture reservoir retaining wall and step e includes placing the cup in the moisture reservoir such that the at least one tab fits into the at least one recess of the retaining wall.

19. The method of claim 16 wherein the cup of step d further includes a flange and step e includes placing the cup in the moisture reservoir such that the flange rests on the top of the retaining wall.

20. The method of claim 16 further including the step of removing a peelable seal from the top of the cup before step e.

21. The method of claim 16 wherein step c of placing the cooking device in a microwave oven to cause the radiant energy of the microwave oven to cook the food occurs after step e such that the radiant energy of the microwave oven also heats liquid based products held by the cup.

22. A cooking device capable of being used in a microwave oven comprising:
   a. a dish portion for containing food to be cooked, the dish portion having a bottom surface and at least one sidewall extending therefrom for containing food to be cooked;
   b. a moisture reservoir positioned within the dish portion for containing a liquid based product, the moisture reservoir including a retaining wall which encloses a central cup portion, the retaining wall having a top and a base;
   c. a lid for covering the dish portion and the moisture reservoir; and
   d. a cup removably positioned within the cup portion of the moisture reservoir.

23. The cooking device of claim 22 wherein the cup includes a flange which rests on the top of the moisture reservoir.

24. The cooking device of claim 22 wherein the retaining wall of the moisture reservoir includes at least one recess, and the cup includes at least one tab in communication with the recess.

* * * * *